(12) United States Patent
Ishikawa et al.

(10) Patent No.: US 9,755,877 B2
(45) Date of Patent: Sep. 5, 2017

(54) PEAK SUPPRESSION DEVICE AND PEAK SUPPRESSION METHOD

(71) Applicant: FUJITSU LIMITED, Kawasaki-shi, Kanagawa (JP)

(72) Inventors: Hiroyoshi Ishikawa, Kawasaki (JP); Hikaru Ishikawa, Kawasaki (JP); Kazuo Nagatani, Yokohama (JP); Takuro Nishikawa, Yokohama (JP); Ryo Koizumi, Kanagawa (JP); Takeshi Sugiyama, Kanagawa (JP); Yasuharu Amezawa, Kanagawa (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/055,342

(22) Filed: Feb. 26, 2016

(65) Prior Publication Data
US 2016/0261445 A1 Sep. 8, 2016

(30) Foreign Application Priority Data
Mar. 5, 2015 (JP) ................................. 2015-044061

(51) Int. Cl.
*H04L 27/26* (2006.01)

(52) U.S. Cl.
CPC ...... *H04L 27/2623* (2013.01); *H04L 27/2626* (2013.01)

(58) Field of Classification Search
CPC ............. H04L 27/2623; H04L 27/2626; H04L 27/2614; H03F 1/32
See application file for complete search history.

(56) References Cited

U.S. PATENT DOCUMENTS

| 2004/0090283 A1* | 5/2004 | Naito .................. H04L 27/2624 333/17.2 |
| 2008/0130767 A1 | 6/2008 | Lozhkin |
| 2009/0060073 A1* | 3/2009 | Yano .................. H04L 27/2614 375/260 |
| 2009/0316827 A1* | 12/2009 | Ishikawa ............. H04L 27/2623 375/296 |
| 2011/0227628 A1* | 9/2011 | Sato ....................... H03F 1/3223 327/361 |
| 2012/0257670 A1 | 10/2012 | Nagatani et al. |

(Continued)

FOREIGN PATENT DOCUMENTS

| JP | 2004-146974 A | 5/2004 |
| JP | 2008-141415 A | 6/2008 |

(Continued)

*Primary Examiner* — Syed Haider
(74) *Attorney, Agent, or Firm* — Arent Fox LLP

(57) ABSTRACT

A peak suppression device includes a suppression-signal generating unit and a band pass filter (BPF). The suppression-signal generating unit generates a suppression signal that is obtained by adding, to a transmission signal, a frequency component in which components of frequencies from a boundary of a band of the transmission signal to a frequency that is away therefrom toward an out-band of the transmission signal by predetermined frequencies are attenuated, out of frequency components of a signal to suppress a peak of the transmission signal. The BPF attenuates, after the suppression signal is amplified by the amplifier, a frequency component outside the band of the transmission signal in the amplified suppression signal.

6 Claims, 13 Drawing Sheets

(56) References Cited

U.S. PATENT DOCUMENTS

| | | | | |
|---|---|---|---|---|
| 2012/0328048 A1* | 12/2012 | Kawasaki | ........... | H04L 27/2623 |
| | | | | 375/296 |
| 2013/0195221 A1 | 8/2013 | Lozhkin | | |
| 2013/0230121 A1* | 9/2013 | Molko | ................ | H04L 27/2623 |
| | | | | 375/295 |
| 2015/0004923 A1* | 1/2015 | Beaudin | ................... | H04B 1/04 |
| | | | | 455/127.2 |

FOREIGN PATENT DOCUMENTS

| | | |
|---|---|---|
| JP | 2009-055558 A | 3/2009 |
| JP | 2010-199995 A | 9/2010 |
| JP | 2011-135200 A | 7/2011 |
| JP | 2013-157955 A | 8/2013 |

\* cited by examiner

PEAK SUPPRESSION DEVICE AND PEAK SUPPRESSION METHOD

CROSS-REFERENCE TO RELATED APPLICATION

This application is based upon and claims the benefit of priority of the prior Japanese Patent Application No. 2015-044061, filed on Mar. 5, 2015, the entire contents of which are incorporated herein by reference.

FIELD

The embodiments discussed herein are directed to a peak suppression device and a peak suppression method.

BACKGROUND

In wireless communication, a generated transmission signal is amplified to a predetermined power by an amplifier to be transmitted. As for the amplifier, the power efficiency is higher as it is operated at an amplification factor in a region closer to a saturation level. However, when a signal having a high peak-to-average power ratio (PAPR) such as an orthogonal frequency division multiplexing (OFDM) signal is amplified, a large backoff is taken, thereby lowering the power efficiency of the amplifier.

As a method of improving the power efficiency of the amplifier, for example, a method of clipping a predetermined amplitude and higher in a transmission signal, and cutting out-band components caused thereby of the transmission signal with a band limiting filter has been known. In this method, out of frequency components of the clipped transmission signal, out-band frequency components of the transmission signal is extracted by a high-pass filter, and the extracted frequency components are subtracted from the frequency components of the clipped transmission signal. Thus, frequency components that suppresses predetermined amplitude and higher in the transmission signal remain, and a transmission signal in which the predetermined amplitude and higher are suppressed is input to the amplifier. Prior art example is disclosed in Japanese Laid-open Patent Publication No. 2008-141415.

The frequency components to suppress predetermined amplitude and higher in a transmission signal are noise for the transmission signal. Therefore, if frequency components to suppress peaks of the amplitude in the transmission signal are included in a band of the transmission signal, the quality of the transmission signal such as an error vector magnitude (EVM) is degraded.

SUMMARY

According to an aspect of an embodiment, a peak suppression device includes a suppression-signal generating unit and a band pass filter. The suppression-signal generating unit generates a suppression signal that is obtained by adding, to a transmission signal, a frequency component in which components of frequencies from a boundary of a band of the transmission signal to a frequency that is away therefrom toward an out-band of the transmission signal by predetermined frequencies are attenuated, out of frequency components of a signal to suppress a peak of the transmission signal. The band pass filter attenuates, after the suppression signal is amplified by an amplifier, a frequency component outside the band of the transmission signal, in the amplified suppression signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a peak suppression device and a peak suppression method disclosed in the present application are explained in detail below with reference to the drawings. Note that a disclosed technique is not limited to the following embodiments. The respective embodiments may be combined appropriately within a range not causing contradiction in processing.

[a] First Embodiment

Wireless Communication Device 10

Figure 1:
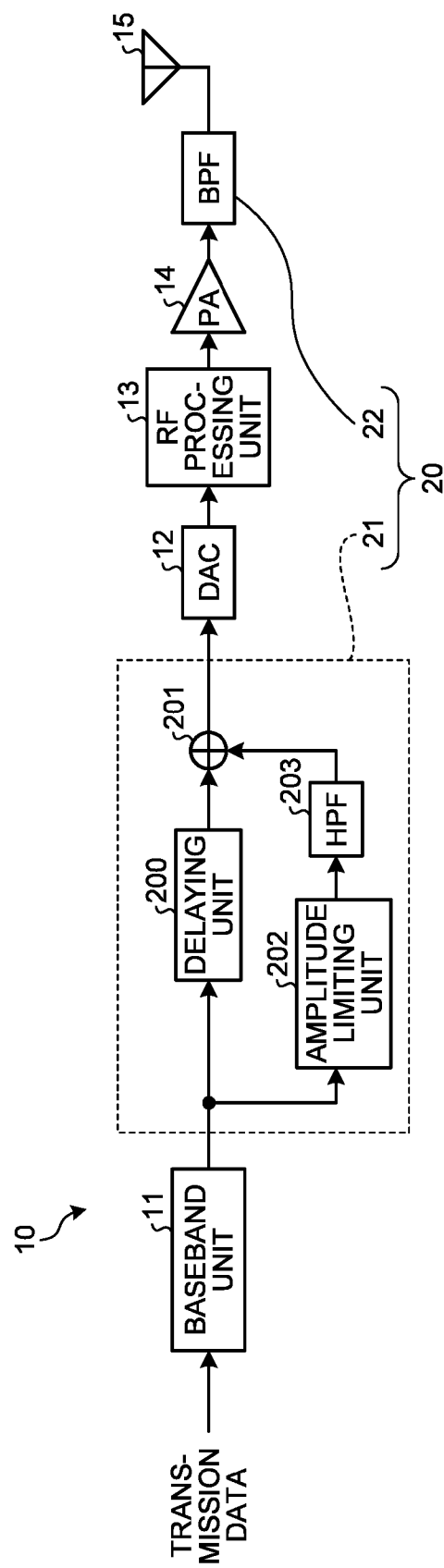
FIG. 1 is a block diagram depicting one example of a wireless communication device of a first embodiment.

FIG. 1 is a block diagram depicting one example of a wireless communication device 10 of a first embodiment. The wireless communication device 10 of the present embodiment includes, for example, a baseband unit 11, a digital-to-analog converter (DAC) 12, a radio-frequency (RF) processing unit 13, an amplifier (power amplifier: PA) 14, an antenna 15, and a peak suppression device 20 as depicted in FIG. 1. The peak suppression device 20 includes a suppression-signal generating unit 21 and a band pass filter (BPF) 22. The wireless communication device 10 is mounted, for example, on a wireless-communication terminal device, a wireless-communication base-station device, and the like used in a wireless communication system.

The baseband unit 11 generates a transmission signal by performing a baseband processing such as coding processing, modulation processing, and the like on input transmission data. The baseband unit 11 outputs a generated transmission signal to the suppression-signal generating unit 21.

The suppression-signal generating unit 21 generates a suppression signal by suppressing peaks of amplitude that is equal to or higher than a threshold in the transmission signal output from the baseband unit 11. The suppression-signal generating unit 21 then outputs the generated suppression signal to the DAC 12.

The DAC 12 converts the suppression signal output from the suppression-signal generating unit 21 from a digital signal to an analog signal. The DAC 12 then outputs the converted signal to the RF processing unit 13.

The RF processing unit 13 performs processing such as upconversion by quadrature modulation and a carrier frequency signal, on the signal output from the DAC 12. The RF processing unit 13 then outputs the signal subjected to the processing to the amplifier 14.

The amplifier 14 amplifies the power of the signal output from the RF processing unit 13, and outputs the amplified signal to the BPF 22.

The BPF 22 attenuates out-band frequency components of the transmission signal out of frequency components of the signal for which the power is amplified by the amplifier 14.

The antenna 15 transmits the signal for which the out-band frequency components of the transmission signal are attenuated by the BPF 22.

Suppression-Signal Generating Unit 21

In the present embodiment, the suppression-signal generating unit 21 includes, for example, a delaying unit 200, a combining unit 201, an amplitude limiting unit 202, and a high-pass filter (HPF) 203 as depicted in FIG. 1.

The amplitude limiting unit 202 generates an amplitude limited signal in which a peak of the amplitude is limited a predetermined threshold or lower in the transmission signal output from the baseband unit 11. For example, the amplitude limiting unit 202 outputs amplitude of a transmission signal when the amplitude of the transmission signal is lower than a predetermined threshold, and outputs the predetermined threshold as the amplitude of the transmission signal when the amplitude of the transmission signal exceeds the predetermined threshold.

The amplitude limited signal in which a peak of the amplitude equal to or higher than the threshold is limited in a transmission signal includes frequency components of the transmission signal and frequency components of the peak suppression signal to suppress peaks of the transmission signal. The frequency components of the peak suppression signal are distributed over a wider band than the band of the transmission signal. The frequency components of the peak suppression signal are included in the amplitude limited signal, thereby limiting the amplitude of the transmission signal to the predetermined threshold or lower. When the frequency components of the peak suppression signal included in the amplitude limited signal are decreased, the amplitude equal to or higher than the predetermined threshold increases in the amplitude limited signal.

The HPF 203 attenuates in-band frequency components of the transmission signal and frequency components corresponding to a frequency at the boundary of the band of the transmission signal to a frequency away therefrom toward the outside of the band the transmission signal by predetermined frequencies, out of the frequency components of the amplitude limited signal generated by the amplitude limiting unit 202. The HPF 203 then outputs the signal subjected to the attenuation to the combining unit 201.

The delaying unit 200 delays the transmission signal output from the baseband unit 11 by a time period corresponding to processing by the amplitude limiting unit 202 and the HPF 203.

The combining unit 201 combines the transmission signal delayed by the delaying unit 200 and the signal output from the HPF 203, to generate a suppression signal in which peaks of the transmission signal are suppressed. The combining unit 201 combines the transmission signal and the signal from the HPF 203, for example, by subtracting the signal from the HPF 203 from the transmission signal. The combining unit 201 then outputs the generated suppression signal to the DAC 12.

Figure 2:
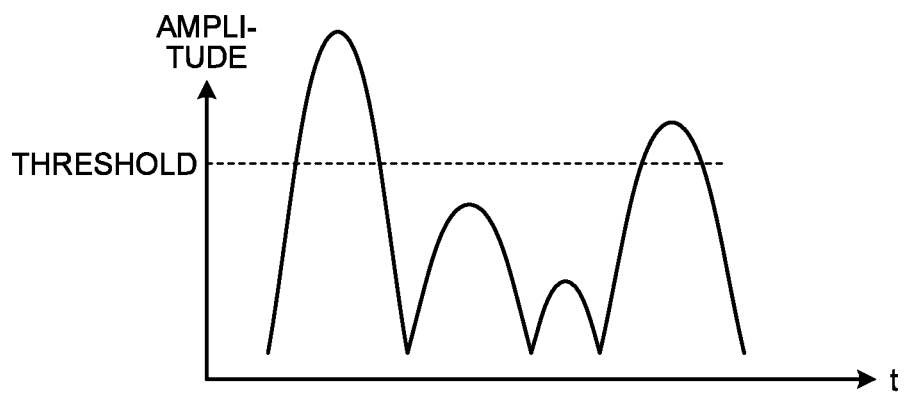
FIG. 2 depicts one example of a transmission signal.
Figure 3:
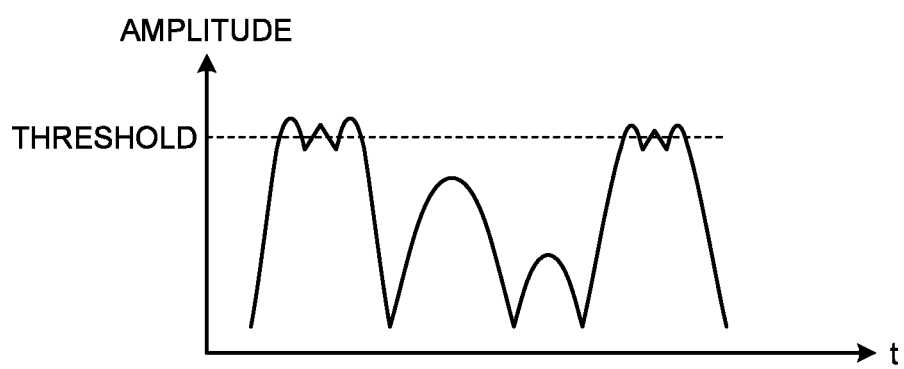
FIG. 3 depicts one example of a suppression signal.

In the transmission signal output from the baseband unit 11, amplitude peaks can exceed a predetermined threshold as depicted in FIG. 2. The suppression-signal generating unit 21 generates a suppression signal by adding a part of frequency components of the peak suppression signal to suppress peaks of amplitude that exceeds the predetermined threshold to the transmission signal. In the suppression signal generated by the suppression-signal generating unit 21, peaks of amplitude that exceeds the predetermined threshold are suppressed as depicted in FIG. 3.

Figure 4:
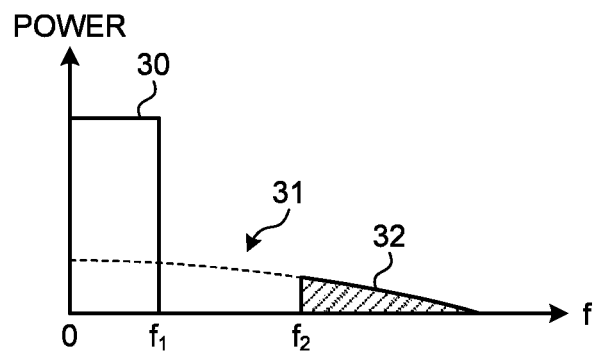
FIG. 4 depicts one example of a suppression signal of the first embodiment.

FIG. 4 depicts one example of a suppression signal of the first embodiment. In FIG. 4, the band of a transmission signal 30 is, for example, a range from 0 to frequency $f_1$. Frequency $f_1$ in FIG. 4 is a frequency at a boundary of the band of the transmission signal 30.

By suppressing peaks of the transmission signal 30 by the amplitude limiting unit 202, for example, as depicted in FIG. 4, frequency components of a peak suppression signal 31 to suppress peaks of the transmission signal 30 are added to the transmission signal 30. The amplitude limited signal generated by the amplitude limiting unit 202 includes frequency components of the transmission signal 30 and the frequency components of the peak suppression signal 31.

The HPF 203 attenuates frequency components of 0 to frequency $f_1$ depicted in FIG. 4 out of the frequency components of the amplitude limited signal that is generated by the amplitude limiting unit 202, and frequency components from frequency $f_1$ depicted in FIG. 4 to frequency $f_2$ that is away toward the outside of the band the transmission signal from frequency $f_1$ depicted in FIG. 4 by predetermined frequencies. Thus, a signal that includes the transmission signal 30 and mainly a frequency component 32 of frequency $f_2$ or higher out of the frequency components of the peak suppression signal 31 depicted in FIG. 4 is output from the HPF 203.

The combining unit 201 combines the transmission signal 30 delayed by the delaying unit 200 and the signal output from the HPF 203. Thus, for example, as depicted in FIG. 4, a suppression signal that is obtained by adding the component 32 of frequency $f_2$ or higher in the peak suppression signal 31 to the transmission signal 30 is generated.

The combining unit 201 can generate the suppression signal in which peaks of amplitude equal to or higher than the predetermined threshold are suppressed by adding the frequency components of the peak suppression signal 31 to the frequency components of the transmission signal 30. Because frequency components within the band of the transmission signal 30 out of the peak suppression signal 31 are attenuated by the HPF 203, in the suppression signal depicted in FIG. 4, the frequency components of the peak suppression signal 31 are little in the band of the transmission signal 30.

Figure 5:
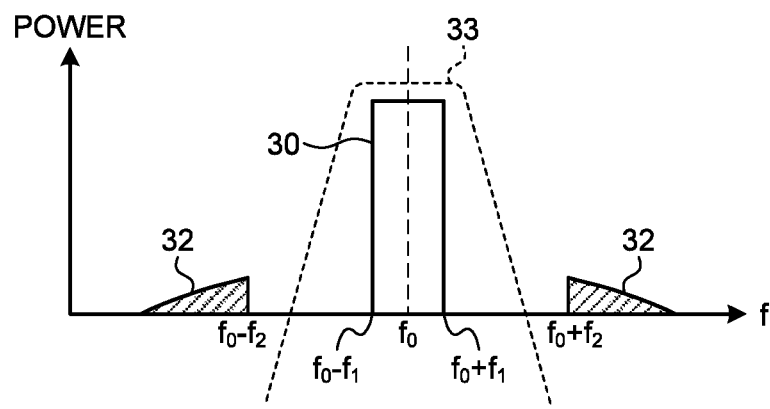
FIG. 5 depicts one example of a signal output from an amplifier of the first embodiment.

FIG. 5 depicts one example of a signal output from the amplifier 14 of the first embodiment. The suppression signal generated by the suppression-signal generating unit 21 is converted into an analog signal by the DAC 12, and is subjected to quadrature modulation and the like by the RF processing unit 13, and is amplified by the amplifier 14. To the amplifier 14, the suppression signal in which amplitude peaks equal to or higher than the predetermined threshold are suppressed by the suppression-signal generating unit 21 is input. Because the amplifier 14 amplifies the suppression signal with low PAPR, the backoff can be reduced and the power efficiency can be improved.

From the amplifier 14, for example, as depicted in FIG. 5, a signal in which the transmission signal 30 is arranged in a frequency region of carrier frequencies $f_0$ to $\pm f_1$, and a part of the frequency component 32 of the peak suppression signal 31 is arranged in a frequency region of $f_0+f_2$ and higher, and in a frequency region of $f_0-f_2$ and lower, is output.

An amplified signal that is output from the amplifier 14 is processed by the BPF 22 having attenuation properties 33 indicated in FIG. 5, for example, such that frequency components outside the band of the transmission signal are attenuated. Thus, the transmission signal 30 in which the component 32 outside the band of the transmission signal 30 are attenuated is output from the antenna 15.

In the suppression signal output from the suppression-signal generating unit 21, a part of the frequency component 32 out of the frequency components of the peak suppression signal 31 to suppress peaks of the transmission signal 30 is included together with the transmission signal 30, for example, as depicted in FIG. 4. Thus, in the suppression signal, amplitude peaks equal to or higher than the predetermined threshold in the transmission signal 30 are suppressed, and PAPR of a signal input to the amplifier 14 is reduced.

Furthermore, the frequency components of the peak suppression signal 31 are combined with the transmission signal 30 by the combining unit 201 after the frequency components in the suppression signal 31 within the band of the transmission signal 30 are attenuated by the HPF 203. Thus, in the suppression signal subjected to combination, frequency components of the peak suppression signal 31 are included little within the band of the transmission signal 30. Therefore, degradation of the quality of the transmission signal 30 such as EVM can be suppressed.

Moreover, $f_2$ that is to be the upper limit of frequency components attenuated by the HPF 203 in the amplitude limited signal is selected so that a signal transmitted from the antenna 15 after passing through the BPF 22 satisfies a spectral mask defined for a signal transmitted from the antenna 15.

For example, when a difference between frequency $f_1$ of the boundary of the band of the transmission signal 30 and frequency $f_2$ to be the upper limit of frequency components to be attenuated in the amplitude limited signal is too small, the frequency component 32 of the peak suppression signal 31 remain in the signal that has passed through the BPF 22, near the band of the transmission signal 30. This can make a frequency spectrum distribution of a signal transmitted from the antenna 15 unsatisfactory for the predetermined spectral mask.

However, when a difference between frequency $f_1$ and frequency $f_2$ is small, a lot of frequency components out of the frequency components of the peak suppression signal 31 are to be added to the transmission signal 30 in the suppression signal. Thus, PAPR of the transmission signal 30 is further lowered, and the backoff of the amplifier 14 can be reduced and the power efficiency of the amplifier 14 can be improved.

On the other hand, when a difference between frequency $f_1$ of the boundary of the band of the transmission signal 30 and frequency $f_2$ to be the upper limit of frequency components to be attenuated in the amplitude limited signal is too large, the frequency component 32 of the peak suppression signal 31 included in the suppression signal decrease. Therefore, the frequency components outside the band of the transmission signal 30 are attenuated by the BPF 22, and thereby the frequency spectrum distribution of a signal transmitted from the antenna 15 becomes satisfactory for the predetermined spectral mask.

However, when a difference between frequency $f_1$ and frequency $f_2$ is large, the frequency component 32 of the peak suppression signal 31 included in the amplitude limited signal decreases, and therefore, PAPR of the transmission signal can increase. Accordingly, a large backoff of the amplifier 14 is taken, and it becomes difficult to improve the power efficiency of the amplifier 14.

Even if a difference between frequency $f_1$ and frequency $f_2$ is large, when an attenuation amount of the BPF 22 in a frequency region outside the band of the transmission signal 30 is small, the frequency spectrum distribution of a signal transmitted from the antenna 15 can become unsatisfactory for the predetermined spectral mask. Moreover, even if a difference between frequency $f_1$ and frequency $f_2$ is small, when an attenuation amount of the BPF 22 in a frequency region outside the band of the transmission signal 30 is large, the frequency spectrum distribution of a signal transmitted from the antenna 15 can become satisfactory for the predetermined spectral mask.

Therefore, for frequency $f_2$, a value is selected, considering the characteristics of the attenuation amount of the BPF 22, so that the frequency spectrum distribution of a signal transmitted from the antenna 15 satisfies the predetermined spectral mask, and that PAPR of the suppression signal input to the amplifier 14 is lower than a desired value. For example, frequency $f_2$ may be an integer time of frequency $f_1$.

Peak Suppression Processing

Figure 6:
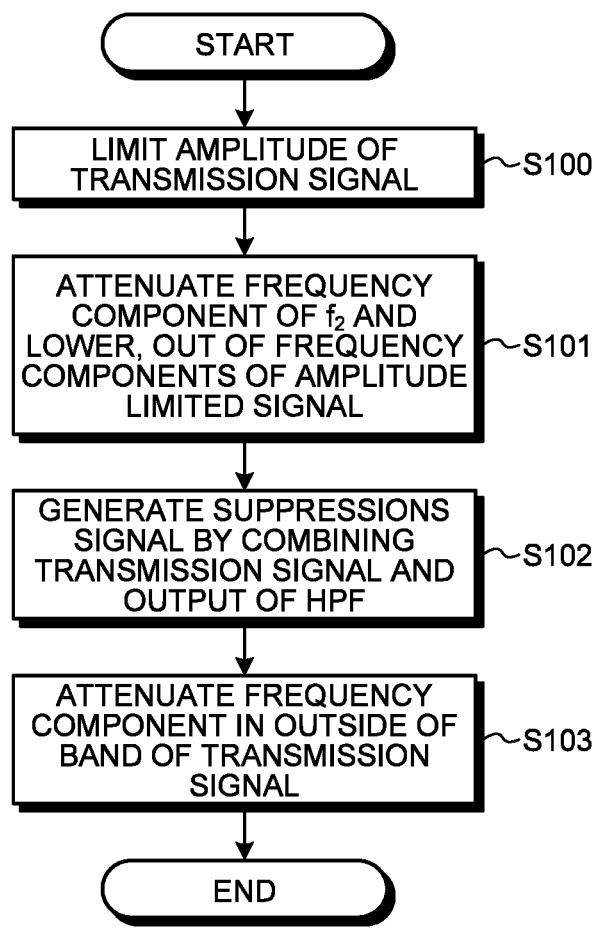
FIG. 6 is a flowchart indicating one example of operation of a suppression-signal generating unit of the first embodiment.

FIG. 6 is a flowchart indicating one example of operation of the suppression-signal generating unit 21 of the first embodiment. The suppression-signal generating unit 21 performs the operation indicated in the flowchart of FIG. 6, for example, every time a transmission signal output from the baseband unit 11 is processed.

First, the amplitude limiting unit 202 limits amplitude equal to or higher than a predetermined threshold in the transmission signal output from the baseband unit 11, to generate an amplitude limited signal (S100).

Subsequently, the HPF 203 attenuates frequency components lower than frequency $f_2$ that is away from the boundary of the band of the transmission signal by predetermined frequencies toward the outside of the band the transmission signal, out of frequency components of the amplitude limited signal that is generated by the amplitude limiting unit 202 (S101).

Subsequently, the combining unit 201 combines the transmission signal delayed by the delaying unit 200 and a signal output from the HPF 203, to generate a suppression signal in which peaks of the transmission signal are suppressed (S102).

The suppression signal generated by the suppression-signal generating unit 21 is converted into an analog signal by the DAC 12, and processing such as quadrature modulation is performed thereon by the RF processing unit 13. The suppression signal processed by the RF processing unit 13 is power amplified by the amplifier 14.

Subsequently, the BPF 22 attenuates frequency components outside the band of the transmission signal, out of frequency components of the signal that is power amplified by the amplifier 14 (S103). The signal in which the frequency components outside the band of the transmission signal are attenuated by the BPF 22 is transmitted from the antenna 15.

As described above, according to the peak suppression device 20 of the present embodiment, the quality of a transmission signal, such as EVM, can be improved while lowering PAPR of the transmission signal.

[b] Second Embodiment

Wireless Communication Device 10

Figure 7:
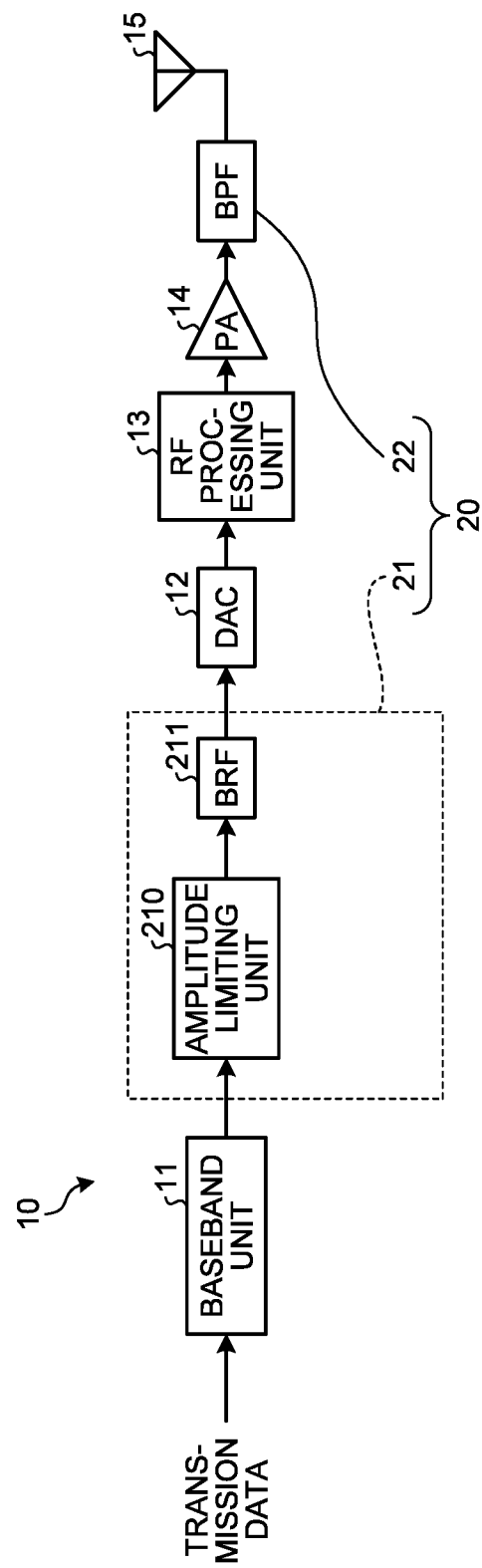
FIG. 7 is a block diagram depicting one example of a wireless communication device of a second embodiment.

FIG. 7 is a block diagram depicting one example of the wireless communication device 10 of a second embodiment. The wireless communication device 10 of the present embodiment includes, for example, the baseband unit 11, the DAC 12, the RF processing unit 13, the amplifier 14, the antenna 15, and the peak suppression device 20 as depicted in FIG. 7. The peak suppression device 20 includes the suppression-signal generating unit 21 and the BPF 22. Note that except a point explained below, the components to which the same reference symbols as those in FIG. 1 are assigned in FIG. 7 have the same or similar functions as the components depicted in FIG. 1, and therefore, explanation thereof is omitted.

In the present embodiment, the suppression-signal generating unit 21 includes an amplitude limiting unit 210 and a band rejection filter (BRF) 211, for example, as depicted in FIG. 7.

The amplitude limiting unit 210 generates an amplitude limited signal in which amplitude of a transmission signal output from the baseband unit 11 is limited within a predetermined threshold, similarly to the amplitude limiting unit 202 explained in the first embodiment, for example. The amplitude limiting unit 210 then outputs the generated amplitude limited signal to the BRF 211.

The BRF 211 attenuates frequency components from frequency $f_1$ at a boundary of a band of the transmission signal to frequency $f_2$ that is away toward the outside of the band the transmission signal by predetermined frequencies, out of frequency components of the amplitude limited signal generated by the amplitude limiting unit 210. The BRF 211 then outputs the attenuated signal to the DAC 12.

Figure 8:
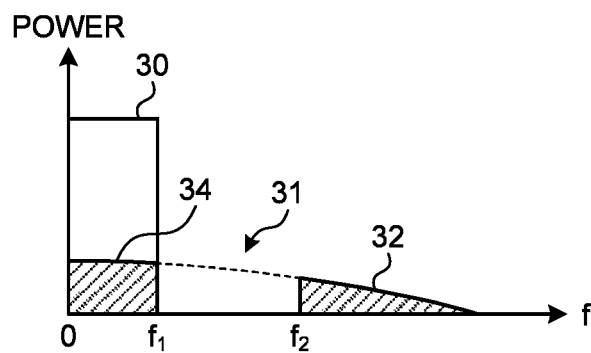
FIG. 8 depicts one example of a suppression signal of the second embodiment.

FIG. 8 depicts one example of a suppression signal of the second embodiment. Peaks of the transmission signal 30 are suppressed by the amplitude limiting unit 210, thereby added, to the transmission signal 30, the frequency components of the peak suppression signal 31 to suppress the peaks of the transmission signal 30, for example, as depicted in FIG. 8.

The BRF 211 attenuates frequency components from frequency $f_1$ to frequency $f_2$ that is away by predetermined frequencies therefrom toward the outside of the band the transmission signal 30 depicted in FIG. 8, out of the frequency components of the amplitude limited signal generated by the amplitude limiting unit 210. Thus, a suppression signal to which a frequency component 34 within the band of the transmission signal 30 and the frequency component 32 of frequency $f_2$ and higher out of the frequency components of the peak suppression signal 31 are added is output from the BRF 211.

Figure 9:
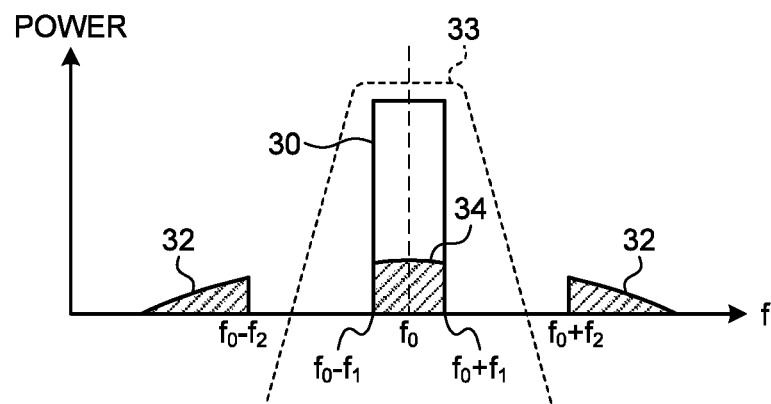
FIG. 9 depicts one example of a signal output from an amplifier of the second embodiment.

FIG. 9 depicts one example of a signal output from the amplifier 14 of the second embodiment. The suppression signal generated by the suppression-signal generating unit 21 is converted into an analog signal by the DAC 12, subjected to processing such as quadrature modulation by the RF processing unit 13, and amplified by the amplifier 14. Thus, a signal, for example, as depicted in FIG. 9 is output from the amplifier 14. In a frequency region of carrier frequencies $f_0$ to $\pm f_1$, for example, the transmission signal 30 and a part of the frequency component 34 of the peak suppression signal 31 are arranged as depicted in FIG. 9. Moreover, in a frequency region of $f_0+f_2$ and higher, and in a frequency region of $f_0-f_2$ and lower, for example, a part of the frequency component 32 of the peak suppression signal 31 is arranged as depicted in FIG. 9.

For the signal output from the amplifier 14, frequency components outside the band of the transmission signal 30 are attenuated by the BPF 22, for example, having the attenuation properties 33 depicted in FIG. 9. Thus, the transmission signal 30 in which a part of the frequency component 34 of the peak suppression signal 31 is included within the band of the transmission signal 30, and a part of the frequency component 32 of the peak suppression signal 31 is attenuated outside the band of the transmission signal 30 is transmitted from the antenna 15.

Figure 10A:
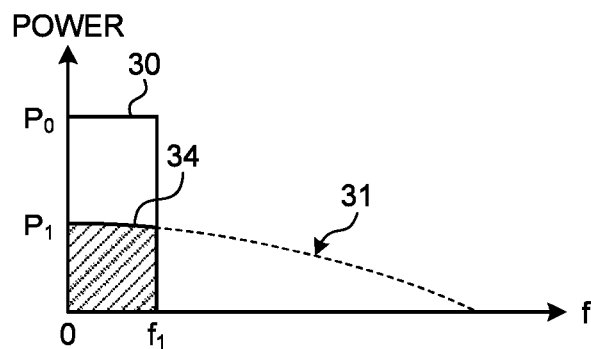
FIG. 10A depicts one example of a suppression signal when peaks are suppressed by using only components within a band of a transmission signal.

If peaks of amplitude of the transmission signal 30 are suppressed by using only the frequency components within the band of the transmission signal 30 out of the frequency components of the peak suppression signal 31, a distribution of frequency components of the generated suppression signal is to be as FIG. 10A, for example. FIG. 10A depicts one example of a suppression signal in which peaks are suppressed by using only components within a band of a transmission signal.

In the suppression signal depicted in FIG. 10A, a predetermined amplitude and higher in the transmission signal 30 are suppressed by the frequency component 34 within the band of the transmission signal 30 out of the frequency components of the peak suppression signal 31. In the suppression signal depicted in FIG. 10A, the transmission signal 30 of power $P_0$ and the frequency component 34 of power $P_1$ are included.

Figure 10B:
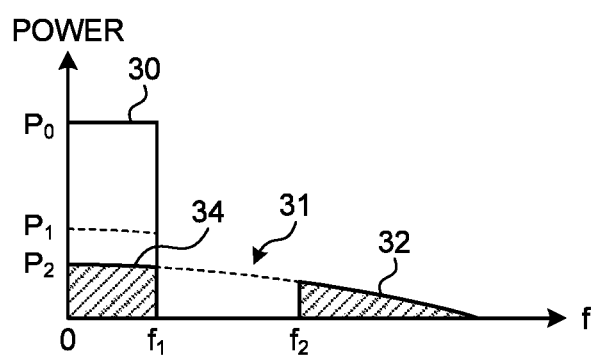
FIG. 10B depicts one example of the suppression signal of the second embodiment.

On the other hand, in the present embodiment, a suppression signal that is obtained by adding, to the transmission signal, a signal in which frequency components from frequency $f_1$ to frequency $f_2$ out of the frequency components of the peak suppression signal 31 are attenuated is generated. FIG. 10B depicts one example of a suppression signal of the second embodiment.

In the suppression signal of the present embodiment, out of the frequency components of the peak suppression signal 31, the frequency component 34 within the band of the transmission signal 30 and the frequency component 32 outside the band of the transmission signal 30 suppress peaks of the predetermined amplitude and higher in the transmission signal 30.

With more frequency components of the peak suppression signal 31, PAPR of the suppression signal becomes lower. Furthermore, as the power of the frequency components of the peak suppression signal 31 included in the suppression signal increases, PAPR of the suppression signal becomes lower.

In the suppression signal exemplified in FIG. 10B, more frequency components, out of the frequency components of the peak suppression signal 31, are added to the transmission signal 30, compared to the suppression signal exemplified in FIG. 10A. Therefore, in the suppression signal exemplified in FIG. 10B, even if the power of the frequency components of the peak suppression signal 31 is lower than that of the suppression signal exemplified in FIG. 10A, PAPR equivalent to the suppression signal exemplified in FIG. 10A can be achieved. Thus, in the suppression signal exemplified in FIG. 10B, power $P_2$ of the frequency component 34 included in the band of the transmission signal 30 can be lower than power $P_1$ of the frequency component 34 in the suppression signal exemplified in FIG. 10A, while keeping PAPR low.

The frequency components of the peak suppression signal 31 are noise for the transmission signal 30. When a ratio of the power of the frequency component 34 of the peak suppression signal 31 to power $P_0$ of the transmission signal 30 increases in the band of the transmission signal 30, the quality of the transmission signal 30 such as EVM is degraded.

In the present embodiment, the power of the frequency component 34 of the peak suppression signal 31 included in the band of the transmission signal 30 can be reduced, while keeping PAPR low. Thus, the peak suppression device 20 of the present embodiment can improve the quality of a transmission signal, while lowering PAPR of the transmission signal.

[c] Third Embodiment

Wireless Communication Device 10

Figure 11:
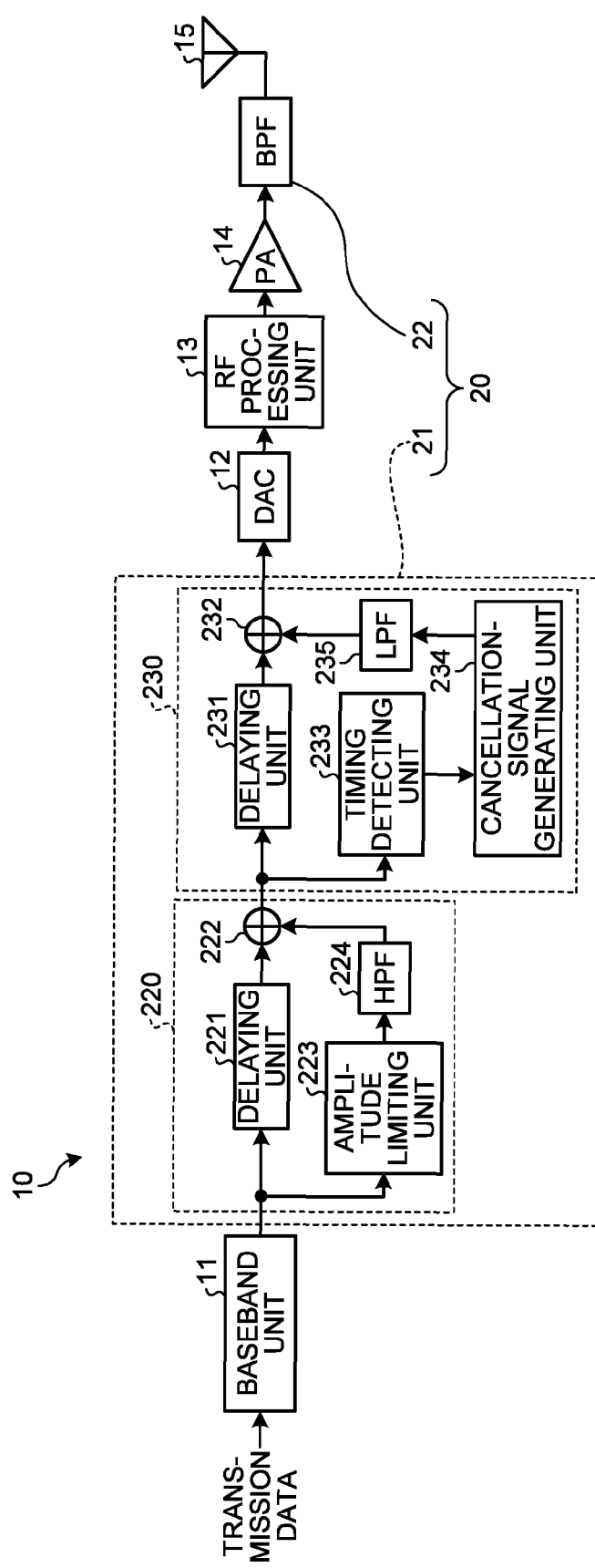
FIG. 11 is a block diagram depicting one example of a wireless communication device of a third embodiment.

FIG. 11 is a block diagram depicting one example of the wireless communication device 10 of a third embodiment. The wireless communication device 10 of the present embodiment includes, for example, the baseband unit 11, the DAC 12, the RF processing unit 13, the amplifier 14, the antenna 15, and the peak suppression device 20, as depicted in FIG. 11. The peak suppression device 20 includes the suppression-signal generating unit 21 and the BPF 22. Note that except a point explained below, the components to which the same reference symbols as those in FIG. 1 are assigned in FIG. 11 have the same or similar functions as the components depicted in FIG. 1, and therefore, explanation thereof is omitted.

In the present embodiment, the suppression-signal generating unit 21 includes a first suppressing unit 220 and a second suppressing unit 230, for example, as depicted in FIG. 11. The first suppressing unit 220 includes a delaying unit 221, a combining unit 222, an amplitude limiting unit 223, and an HPF 224. The first suppressing unit 220 has, for example, a similar function as the suppression-signal generating unit 21 explained in the first embodiment. Specifically, the delaying unit 221, the combining unit 222, the amplitude limiting unit 223, and the HPF 224 have similar functions as the delaying unit 200, the combining unit 201, the amplitude limiting unit 202, and the peak suppression device 20, respectively.

The second suppressing unit 230 includes a delaying unit 231, a combining unit 232, a timing detecting unit 233, a cancellation-signal generating unit 234, and a low pass filter (LPF) 235.

The timing detecting unit 233 monitors peaks of amplitude of a signal that is output from the combining unit 222 of the first suppressing unit 220, and detects timing of a peak of amplitude that exceeds a predetermined threshold and the amplitude of the peak from the predetermined threshold. The timing detecting unit 233 then outputs detected timing of the peaks to the cancellation-signal generating unit 234 together with information about the amplitude from the threshold.

The cancellation-signal generating unit 234 generates a cancellation signal having peaks at the timing that is output from the timing detecting unit 233, and having amplitude that corresponds to the information about the amplitude that is output from the timing detecting unit 233. The cancellation-signal generating unit 234 generates the cancellation signal by using a unit impulse signal that synchronizes with the timing output from the timing detecting unit 233, and that has the amplitude output from the timing detecting unit 233.

The cancellation-signal generating unit 234 may store cancellation signals with various timings and amplitude in a lookup table in a memory in advance. Furthermore, the cancellation-signal generating unit 234 may generate a cancellation signal by acquiring a cancellation signal corresponding to information output from the timing detecting unit 233 from the lookup table.

The LPF 235 attenuates frequency components equal to or higher than frequency $f_1$ that are the frequency components outside the band of a transmission signal, out of frequency components of the cancellation signal generated by the cancellation-signal generating unit 234. Thus, a cancellation signal having frequency components within the band of the transmission signal is output from the LPF 235.

The delaying unit 231 delays the signal that is output from the combining unit 222 of the first suppressing unit 220 by a time period corresponding to processing performed by the timing detecting unit 233, the cancellation-signal generating unit 234, and the LPF 235.

The combining unit 232 combines a signal delayed by the delaying unit 231 and the cancellation signal output from the LPF 235 by subtracting the cancellation signal output from the LPF 235 from the signal delayed by the delaying unit 231, to generate a suppression signal. The combining unit 232 then outputs the generated suppression signal to the DAC 12.

Figure 12:
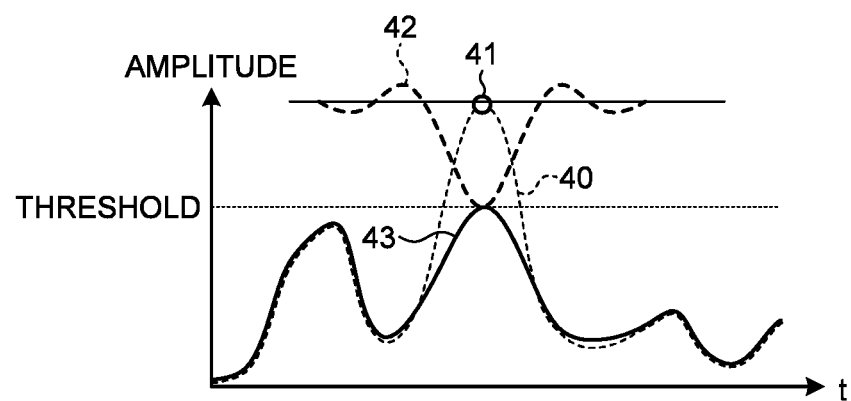
FIG. 12 is a diagram for explaining one example of a process of peak suppression by a cancellation signal.

FIG. 12 is a diagram for explaining one example of a process of peak suppression by a cancellation signal. From the LPF 235, for example, a cancellation signal 42 that synchronizes with timing of a peak 41 of the amplitude exceeding a predetermined threshold, and that has an amplitude corresponding to the amplitude of the peak 41 from the threshold in a signal 40 that is output from the first suppressing unit 220 is output as depicted in FIG. 12. The combining unit 232 subtracts the cancellation signal 42 from the signal 40 output from the first suppressing unit 220. Thus, a suppression signal 43 in which peaks of amplitude are limited within a range of a predetermined threshold is generated.

Figure 13:
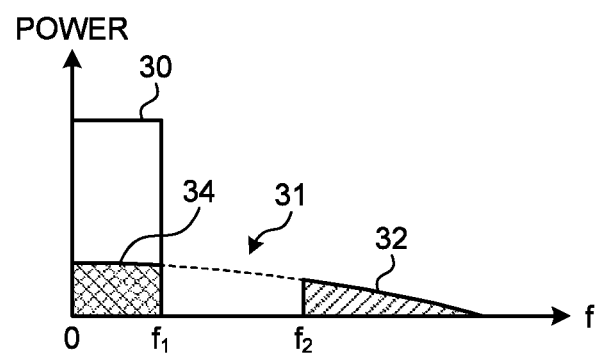
FIG. 13 depicts one example of a suppression signal of the third embodiment.

FIG. 13 depicts one example of a suppression signal of the third embodiment. Peaks of the transmission signal 30 are suppressed by the first suppressing unit 220 and the second suppressing unit 230, thereby generating a suppression signal in which the frequency components 32 and 34 of the peak suppression signal 31 to suppress peaks of a transmission signal are added to the transmission signal 30, for example as depicted in FIG. 13.

The frequency component 32 of frequency $f_2$, which is away from frequency $f_1$ at the boundary of the band of the transmission signal 30 by predetermined frequencies toward the outside of the band the transmission signal 30, and higher out of the frequency components of the peak suppression signal 31 is added to the transmission signal 30 by the first suppressing unit 220. Furthermore, the frequency component 34 within the band of the transmission signal 30 out of the frequency components of the peak suppression signal 31 is added to the transmission signal 30 by the second suppressing unit 230.

In the signal output from the amplifier 14, frequency components outside the band of the transmission signal 30 are attenuated by the BPF 22 having, for example, the attenuation properties 33 depicted in FIG. 9. Thus, the transmission signal 30 that includes the frequency component 34 of the cancellation signal in the band of the transmission signal, and in which a part of the frequency component 32 of the peak suppression signal 31 is attenuated outside the band of the transmission signal 30 is transmitted from the antenna 15.

In the first suppressing unit 220, a part of the frequency components of the peak suppression signal 31 to suppress peaks of a transmission signal is attenuated by the HPF 224. Therefore, in a signal output from the first suppressing unit 220, there is a case in which peaks of amplitude exceeding the predetermined threshold are restored a little. In the present embodiment, the signal obtained by suppressing peaks of a transmission signal by the first suppressing unit 220 is further subjected to peak suppression by the second suppressing unit 230. Thus, PAPR in a suppression signal input to the amplifier 14 can be further lowered.

Although for a signal in which peaks of amplitude are suppressed by the first suppressing unit 220, peaks of amplitude are further suppressed by the second suppressing unit 230 in the present embodiment, the disclosed technique is not limited thereto, and the sequence of the first suppressing unit 220 and the second suppressing unit 230 may be reversed. That is, a suppression signal may be generated by suppressing peaks of amplitude are further suppressed by the first suppressing unit 220 for a signal in which peaks of amplitude are suppressed by the second suppressing unit 230.

[d] Fourth Embodiment

Wireless Communication Device 10

Figure 14:
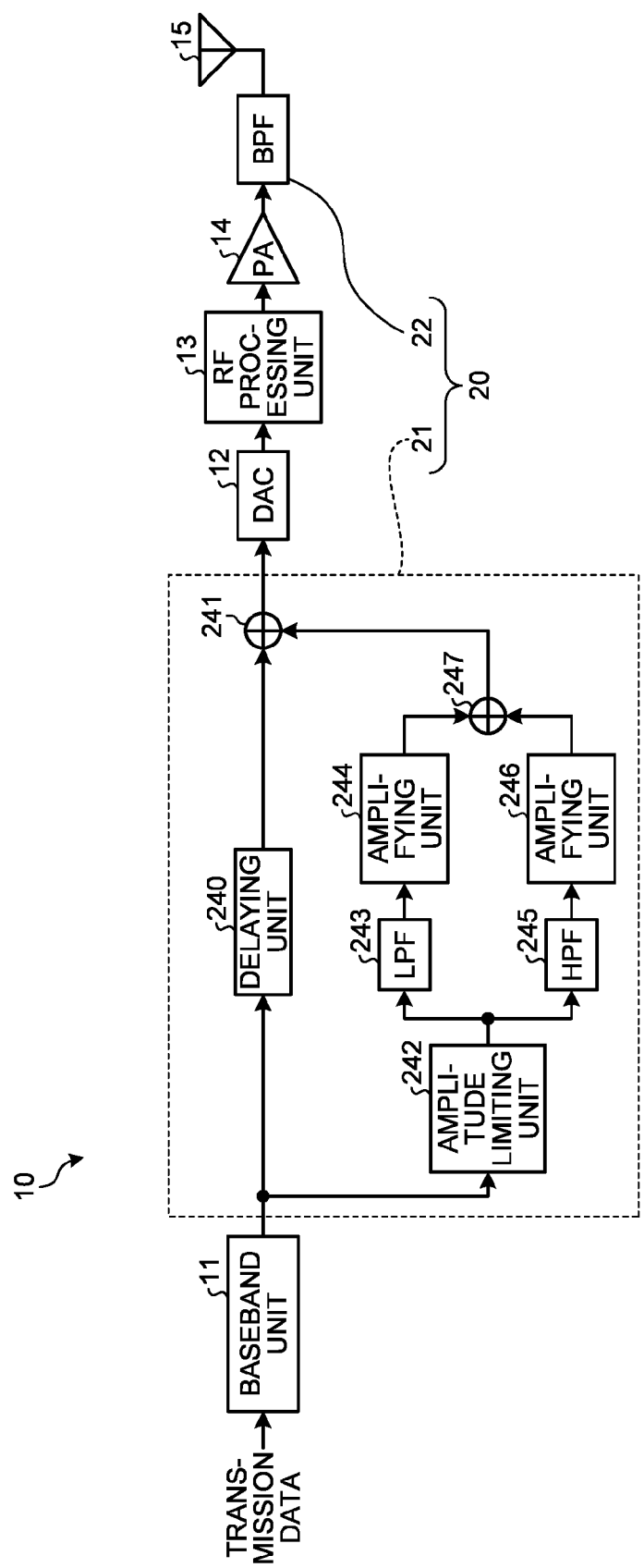
FIG. 14 is a block diagram depicting one example of a wireless communication device of a fourth embodiment.

FIG. 14 is a block diagram depicting one example of the wireless communication device 10 of a fourth embodiment. The wireless communication device 10 of the present embodiment includes, for example, the baseband unit 11, the DAC 12, the RF processing unit 13, the amplifier 14, the antenna 15, and the peak suppression device 20 as depicted in FIG. 14. The peak suppression device 20 includes the suppression-signal generating unit 21 and the BPF 22. Note that except a point explained below, the components to which the same reference symbols as those in FIG. 1 are assigned in FIG. 14 have the same or similar functions as the components depicted in FIG. 1, and therefore, explanation thereof is omitted.

In the present embodiment, the suppression-signal generating unit 21 includes, for example, a delaying unit 240, a combining unit 241, an amplitude limiting unit 242, an LPF 243, an amplifying unit 244, an HPF 245, an amplifying unit 246 and a combining unit 247 as depicted in FIG. 14.

The amplitude limiting unit 242 generates an amplitude limited signal in which amplitudes of a transmission signal that is output from the baseband unit 11 are limited within a predetermined threshold. The amplitude limiting unit 242 then outputs the generated amplitude limited signal to the LPF 243 and the HPF 245.

The LPF 243 attenuates frequency components out of a band (0 to $f_1$) of the transmission signal, out of frequency components of the amplitude limited signal output from the amplitude limiting unit 242. The LPF 243 then outputs the signal subjected to attenuation to the amplifying unit 244.

The amplifying unit 244 amplifies the power of the signal output from the LPF 243 with a first amplification factor. The amplifying unit 244 then outputs the simplified signal to the combining unit 247.

The HPF 245 attenuates frequency components of frequency $f_2$, which is away from frequency $f_1$ at the boundary of the band of the transmission signal toward the out-band by predetermined frequencies, and lower out of the frequency components of the amplitude limited signal that is output from the amplitude limiting unit 242. The HPF 245 then outputs the attenuated signal to the amplifying unit 246.

The amplifying unit 246 amplifies the power of the signal output from the HPF 245 with a second amplification factor that is controlled independently of the first amplification factor. The amplifying unit 246 then outputs the amplified signal to the combining unit 247. The second amplification factor may be the same value as the first amplification factor, or be a different value.

The combining unit 247 adds the signal output from the amplifying unit 244 and the signal output from the amplifying unit 246 to combine the signals. The combining unit 247 then outputs the combined signal to the combining unit 241.

The delaying unit 240 delays the transmission signal output from the baseband unit 11 by a time period corresponding to processing performed by the amplitude limiting unit 242, the LPF 243, the amplifying unit 244, the HPF 245, the amplifying unit 246, and the combining unit 247.

The combining unit 241 subtracts the signal output from the combining unit 247 from the transmission signal that is delayed by the delaying unit 240, to combine the transmission signal and the signal from the combining unit 247, thereby generating a suppression signal in which peaks of the transmission signal are suppressed. The combining unit 241 then outputs the generated suppression signal to the DAC 12.

Figure 15:
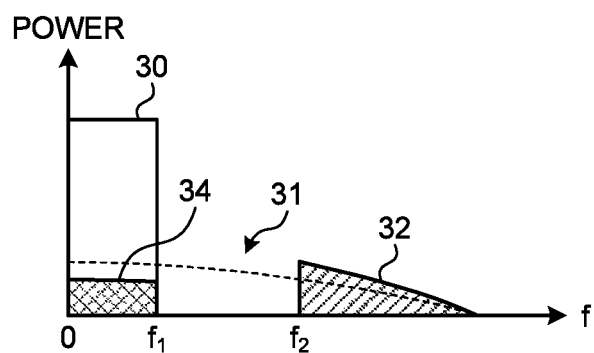
FIG. 15 depicts one example of a suppression signal of the fourth embodiment.

FIG. 15 depicts one example of a suppression signal of the fourth embodiment. Peaks of the transmission signal 30 are suppressed by the suppression-signal generating unit 21, thereby added, to a transmission signal, the frequency components 32 and 34 of the peak suppression signal 31 to suppress peaks of the transmission signal, to generate a suppression signal.

Out of frequency components of the peak suppression signal 31, the frequency components 32 of frequency $f_2$, which is away from frequency $f_1$ at the boundary of the band of the transmission signal 30 toward the outside of the band the transmission signal 30 by predetermined frequencies, and higher is amplified by the amplifying unit 246 with the second amplification factor to be added to the transmission signal 30. Moreover, out of the frequency components of the peak suppression signal 31, the frequency component 34 within the band (0 to $f_1$) of the transmission signal 30 is amplified by the amplifying unit 244 with the first amplification factor to be added to the transmission signal 30.

The suppression-signal generating unit 21 of the present embodiment can control the power of the frequency component 34 included in the band of the transmission signal 30 and the power of the frequency component 32 included in the outside of the band of the transmission signal 30 independently of each other in the suppression signal.

Thus, for example, when PAPR is not lowered to a desired value only with the frequency component 32 of the peak suppression signal 31 included in the outside of the band of the transmission signal 30, the frequency component 34 of the peak suppression signal 31 included in the band of the transmission signal 30 can be added at low power. This enables to lower PAPR to the desired value while maintaining the quality of the transmission signal.

Furthermore, for example, when the quality of a transmission signal is low, a control of decreasing the power of the frequency component 34 of the peak suppression signal 31 included in the band of the transmission signal, and of increasing the power of the frequency component 32 of the peak suppression signal 31 included in the outside of the band of the transmission signal 30 is possible. This enables to improve the quality of the transmission signal while maintaining a PAPR value.

[a] Fifth Embodiment

Wireless Communication Device 10

Figure 16:
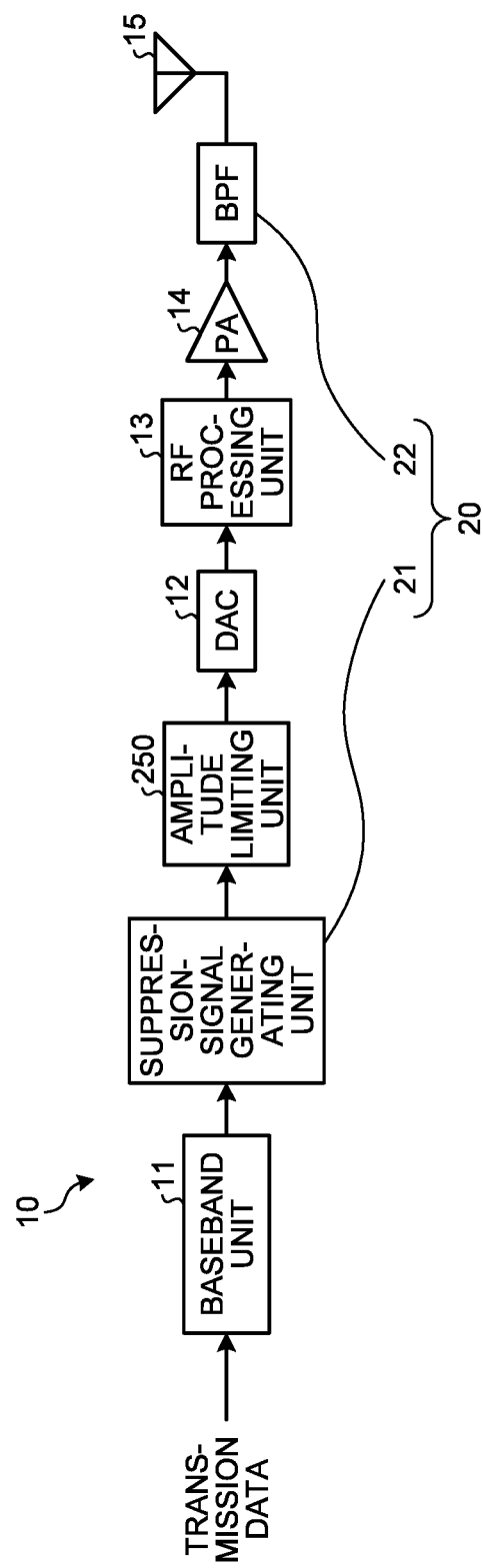
FIG. 16 is a block diagram depicting one example of a wireless communication device of a fifth embodiment.

FIG. 16 is a block diagram depicting one example of the wireless communication device 10 of a fifth embodiment. The wireless communication device 10 of the present embodiment includes, for example, the baseband unit 11, the DAC 12, the RF processing unit 13, the amplifier 14, the antenna 15, the peak suppression device 20, and an amplitude limiting unit 250 as depicted in FIG. 16. The peak suppression device 20 includes the suppression-signal generating unit 21 and the BPF 22. Note that except a point explained below, the components to which the same reference symbols as those in FIG. 1 are assigned in FIG. 16 have the same or similar functions as the components depicted in FIG. 1, and therefore, explanation thereof is omitted.

The suppression-signal generating unit 21 generates a suppression signal by suppressing peaks of amplitude equal to or higher than a predetermined threshold in a transmission signal that is output from the baseband unit 11. The suppression-signal generating unit 21 then outputs the generated suppression signal to the amplitude limiting unit 250. As the suppression-signal generating unit 21 of the present embodiment, the suppression-signal generating unit 21 explained in the first to the fourth embodiments described above can be used.

The amplitude limiting unit 250 further limits the amplitude of the suppression signal output from the suppression-signal generating unit 21 within a predetermined threshold. The amplitude limiting unit 250 then outputs the suppression signal in which amplitude is limited, to the DAC 12.

To the suppression signal generated by the suppression-signal generating unit 21, a part of frequency components out of the frequency components of the peak suppression signal to suppress peaks of amplitude of a transmission signal is added. Therefore, peaks of amplitude that exceed the predetermined threshold are not completely limited to be equal to or lower than the predetermined threshold, and for example, as depicted in FIG. 3, there is a case in which an amplitude that slightly exceeds the predetermined threshold occurs.

Figure 17:
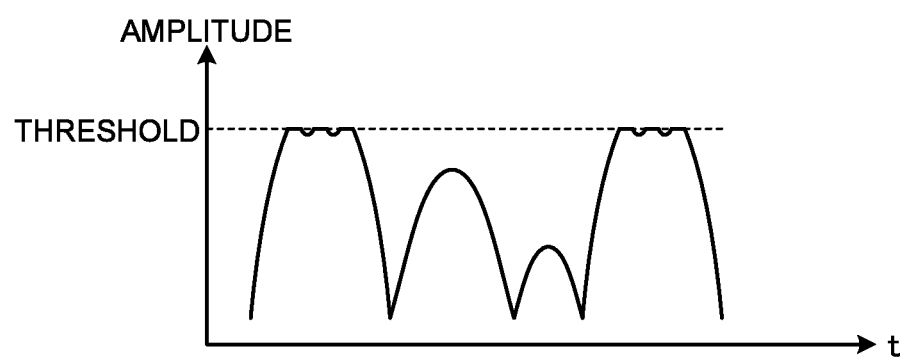
FIG. 17 depicts one example of a suppression signal of the fifth embodiment.

The amplitude limiting unit 250 further suppresses a peak of amplitude that slightly exceeds the predetermined threshold in the suppression signal output from the suppression-signal generating unit 21, thereby outputting a suppression signal as depicted in FIG. 17, for example. In the suppression signal depicted in FIG. 17, a peak of amplitude that slightly exceeds the predetermined threshold is clipped at the predetermined threshold. Therefore, in the suppression signal depicted in FIG. 17, frequency components of the peak suppression signal that occur by clipping are included.

The frequency components of the peak suppression signal that have occurred by clipping distribute in a wider range than the band of the transmission signal. However, the peak of amplitude clipped by the amplitude limiting unit 250 is a peak of amplitude that slightly exceeds the predetermined threshold in the signal in which peaks of amplitude have already been suppressed by the suppression-signal generating unit 21. Therefore, the peak of amplitude that is clipped by the amplitude limiting unit 250 rarely occurs, and the amplitude of the peak from the threshold is small. Accordingly, the power of the frequency components of the peak suppression signal that occur by clipping by the amplitude limiting unit 250 is a little to the power of the transmission signal. Therefore, a signal that is transmitted from the antenna 15 by being attenuated by the BPF 22 after amplified by the amplifier 14, can satisfy the specification of the spectral mask. Furthermore, the suppression signal in which amplitude equal to or higher than the predetermined threshold is limited by the amplitude limiting unit 250 has further lower PAPR. Thus, the backoff of the amplifier 14 can be reduced, and the power efficiency can be further improved.

Modification

The technique disclosed in the present application is not limited to the respective embodiments described above, but various modifications can be made within a range of the gist.

For example, in the first embodiment described above, the suppression-signal generating unit 21 may generate a suppression signal by using a cancellation signal that is synchronized with timing of a peak of amplitude that exceeds a predetermined threshold in a transmission signal output from the baseband unit 11.

For example, in the first embodiment described above, the suppression-signal generating unit 21 detects timing of a peak of amplitude that exceeds the predetermined threshold, and the amplitude of the peak from the predetermined threshold, in a transmission signal output from the baseband unit 11. Subsequently, the suppression-signal generating unit 21 generates a cancellation signal that synchronizes with the detected timing of the peak and that has amplitude corresponding to the detected amplitude from the predetermined threshold by using an impulse signal. The suppression-signal generating unit 21 then attenuates components of frequency $f_2$, which is away from frequency $f_1$ at the boundary of the band of the transmission signal by predetermined frequencies toward the outside of the band the transmission signal, and lower, out of frequency components of the generated cancellation signal. Subsequently, the suppression-signal generating unit 21 generates a suppression signal by subtracting the attenuated cancellation signal from the transmission signal.

Moreover, in the second embodiment described above also, the suppression-signal generating unit 21 may generate a suppression signal by using a cancellation signal that is synchronized with timing of a peak of amplitude that exceeds a predetermined threshold in a transmission signal output from the baseband unit 11.

For example, in the second embodiment described above, the suppression-signal generating unit 21 detects timing of a peak of amplitude that exceeds the predetermined threshold and the amplitude of the peak from the predetermined threshold in a transmission signal output from the baseband unit 11. Subsequently, the suppression-signal generating unit 21 generates a cancellation signal that synchronizes with the detected timing of the peak and has amplitude corresponding to the detected amplitude from the predetermined threshold by using an impulse signal. The suppression-signal generating unit 21 then attenuates components from frequency $f_1$ at the boundary of the band of the transmission signal to frequency $f_2$, which is away therefrom by predetermined frequencies toward the outside of the band the transmission signal, out of frequency components of the generated cancellation signal. The suppression-signal generating unit 21 then generates an amplitude limited signal subjected to attenuation as a suppression signal.

Furthermore, in the third embodiment described above, the first suppressing unit 220 may generate a signal in which peaks of amplitude are suppressed by using a cancellation signal that is synchronized with timing of a peak of amplitude that exceeds a predetermined threshold in a transmission signal output from the baseband unit 11.

For example, in the third embodiment described above, the first suppressing unit 220 detects timing of a peak of amplitude that exceeds a predetermined threshold and the amplitude of the peak from the predetermined threshold in a transmission signal output from the baseband unit 11. Subsequently, the first suppressing unit 220 generates a cancellation signal that synchronizes with the detected time of the peak and has amplitude corresponding to the detected amplitude from the predetermined threshold by using an impulse signal. The first suppressing unit 220 attenuates components from frequency $f_1$ at the boundary of the band of the transmission signal to frequency $f_2$, which is away therefrom by predetermined frequencies toward the outside of the band the transmission signal, out of frequency components of the generated cancellation signal. The first suppressing unit 220 then outputs a signal that is generated by subtracting the cancellation signal subjected to attenuation from the transmission signal, to the second suppressing unit 230.

Furthermore, in the fourth embodiment described above, a signal that is combined with a transmission signal by the combining unit 241 may be generated by using a cancellation signal that is synchronized with timing of a peak of amplitude of the transmission signal that exceeds a predetermined threshold.

For example, in the fourth embodiment described above, the amplitude limiting unit 242 detects timing of a peak of amplitude that exceeds the predetermined threshold and amplitude of the peak from the predetermined threshold, in a transmission signal output from the baseband unit 11. Subsequently, the amplitude limiting unit 242 generates a cancellation signal that synchronizes with the detected timing of the peak and has amplitude corresponding to the detected amplitude from the predetermined threshold by using an impulse signal. The amplitude limiting unit 242 then outputs the generated cancellation signal to the LPF 243 and the HPF 245.

According to one embodiment, it is possible to improve the quality of a transmission signal while lowering PAPR of the transmission signal.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A peak suppression device comprising:
a suppression-signal generating unit that generates a suppression signal that is obtained by adding, to a transmission signal, a frequency component in which components of frequencies from a boundary of a band of the transmission signal to a frequency that is away therefrom toward an out-band of the transmission signal by predetermined frequencies are attenuated, out of frequency components of a signal to suppress a peak of the transmission signal; and
a band pass filter that attenuates, after the suppression signal is amplified by an amplifier, a frequency component outside the band of the transmission signal, in the amplified suppression signal, wherein:
the suppression signal further includes frequency components of a signal to suppress a peak of the transmission signal within the band of the transmission signal, and
the suppression-signal generating unit includes:
a low pass filter that attenuates, among frequency components of the signal to suppress a peak of the transmission signal, a frequency component out of the band of the transmission signal;
a first amplifying unit that amplifies, with a first amplification factor, a signal output from the low pass filter;
a high pass filter that attenuates, among frequency components of the signal to suppress a peak of the transmission signal, a frequency component within the band of the transmission signal and a frequency component which is from a boundary of the band of the transmission signal to a frequency that is away therefrom toward an out-band of the transmission signal by a predetermined frequency;
a second amplifying unit that amplifies, with a second amplification factor that is controlled independently of the first amplification factor, a signal output from the high pass filter; and
a combining unit that combines the signal output amplified by the first amplifying unit and the signal output amplified by the second amplifying unit to generate the suppression signal.

2. A peak suppression device comprising:
a suppression-signal generating unit that generates a suppression signal that is obtained by adding, to a transmission signal, a frequency component in which components of frequencies from a boundary of a band of the transmission signal to a frequency that is away therefrom toward an out-band of the transmission signal by predetermined frequencies are attenuated, out of frequency components of a signal to suppress a peak of the transmission signal; and
a band pass filter that attenuates, after the suppression signal is amplified by an amplifier, a frequency component outside the band of the transmission signal, in the amplified suppression signal, wherein the suppression-signal generating unit includes:
a detecting unit that detects timing of a peak of amplitude that exceeds a predetermined threshold out of peaks of amplitude of the transmission signal;
a signal generating unit that generates a cancellation signal having a peak synchronized with the timing detected by the detecting unit, and having frequency components in which a frequency component in the band of the transmission signal and a frequency component of frequencies from the boundary of the band of the transmission signal to a frequency away therefrom toward the outside of the band of the transmission signal by predetermined frequencies, out of frequency components of an impulse signal are attenuated; and a combining unit that combines the transmission signal and the cancellation signal, thereby generating the suppression signal.

3. A peak suppression device comprising:

a suppression-signal generating unit that generates a suppression signal that is obtained by adding, to a transmission signal, a frequency component in which components of frequencies from a boundary of a band of the transmission signal to a frequency that is away therefrom toward an out-band of the transmission signal by predetermined frequencies are attenuated, out of frequency components of a signal to suppress a peak of the transmission signal; and a band pass filter that attenuates, after the suppression signal is amplified by an amplifier, a frequency component outside the band of the transmission signal, in the amplified suppression signal, wherein:

the suppression-signal generating unit further generates the suppression signal in which a frequency component within the band of the transmission signal, out of frequency components of a signal to suppress a peak of the transmission signal, is further added to the transmission signal, and the suppression-signal generating unit includes:

a detecting unit that detects timing of a peak of amplitude that exceeds a predetermined threshold, out of peaks of amplitude of the transmission signal;

a signal generating unit that generates a cancellation signal having a peak synchronized with the timing detected by the detecting unit, and having frequency components in which a frequency component of frequencies from the boundary of the band of the transmission signal to a frequency away therefrom toward the outside of the band of the transmission signal by predetermined frequencies, out of frequency components of an impulse signal is attenuated; and a combining unit that combines the transmission signal and the cancellation signal, thereby generating the suppression signal.

4. A peak suppression device comprising:

a suppression-signal generating unit that generates a suppression signal that is obtained by adding, to a transmission signal, a frequency component in which components of frequencies from a boundary of a band of the transmission signal to a frequency that is away therefrom toward an out-band of the transmission signal by predetermined frequencies are attenuated, out of frequency components of a signal to suppress a peak of the transmission signal; and a band pass filter that attenuates, after the suppression signal is amplified by an amplifier, a frequency component outside the band of the transmission signal, in the amplified suppression signal, wherein:

the suppression-signal generating unit further generates the suppression signal in which a frequency component within the band of the transmission signal, out of frequency components of a signal to suppress a peak of the transmission signal, is added to the transmission signal, the suppression-signal generating unit includes:

a first suppressing unit; and a second suppressing unit, the first suppressing unit includes:

a first amplitude-limiting unit that generates an amplitude limited signal in which an amplitude of the transmission signal is limited within a predetermined threshold;

a high pass filter that attenuates a frequency component within the band of the transmission signal and a frequency component of frequencies from the boundary of the band of the transmission signal to a frequency away therefrom toward the outside of the band of the transmission signal by predetermined frequencies, out of frequency components of the amplitude limited signal; and a first combining unit that combines the transmission signal and a signal output from the high pass filter, and the second suppressing unit includes:

a detecting unit that detects timing of a peak of amplitude that exceeds a predetermined threshold out of peaks of amplitude of a signal output from the first combining unit;

a signal generating unit that generates a cancellation signal that has a peak synchronized with the timing detected by the detecting unit, and in which a frequency component outside the band of the transmission signal is attenuated; and a second combining unit that combines a signal output from the first combining unit and the cancellation signal, thereby generating the suppression signal.

5. The peak suppression device according to claim 1, further comprising a second amplitude-limiting unit that limits an amplitude of the suppression signal output from the suppression-signal generating unit within a predetermined threshold, wherein the amplifier amplifies a suppression signal in which an amplitude is limited by the second amplitude-limiting unit.

6. A peak suppression method comprising:

generating a suppression signal that is obtained by adding, to a transmission signal, a frequency component in which components of frequencies from a boundary of a band of the transmission signal to a frequency that is away therefrom toward an out-band of the transmission signal by predetermined frequencies are attenuated, out of frequency components of a signal to suppress a peak of the transmission signal; and attenuating, after the suppression signal is amplified by an amplifier, a frequency component outside the band of the transmission signal, in the amplified suppression signal, wherein the suppression signal includes frequency components of a signal to suppress a peak of the transmission signal within the band of the transmission signal, and wherein the generating a suppression signal comprises:

attenuating, among frequency components of the signal to suppress a peak of the transmission signal, a frequency component out of the band of the transmission signal;

amplifying, with a first amplification factor, a signal of which frequency component out of the band of the transmission signal is attenuated;

attenuating, among frequency components of the signal to suppress a peak of the transmission signal, a frequency component within the band of the transmission signal and a frequency component which is from a boundary of the band of the transmission signal to a frequency that is away therefrom toward an out-band of the transmission signal by a predetermined frequency;

amplifying, with a second amplification factor that is controlled independently of the first amplification factor, a signal of which the frequency component within the band of the transmission signal and the frequency component which is from the boundary of the band of the transmission signal to a frequency that is away therefrom toward the out-band of the transmission signal by predetermined frequencies are attenuated; and combining the signal amplified with the first amplification factor and the signal amplified with the second amplification factor to generate the suppression signal.

* * * * *